United States Patent

Kakiuchi

[11] Patent Number: 5,835,143
[45] Date of Patent: Nov. 10, 1998

[54] AUTOMATIC FOCUSING SYSTEM FOR A STILL VIDEO CAMERA

[75] Inventor: Shinichi Kakiuchi, Tokyo, Japan

[73] Assignee: Asahi Kogaku Kogyo Kabushiki Kaisha, Tokyo, Japan

[21] Appl. No.: 921,704

[22] Filed: Sep. 2, 1997

Related U.S. Application Data

[63] Continuation of Ser. No. 695,547, Aug. 12, 1996, abandoned, which is a continuation of Ser. No. 299,425, Sep. 1, 1994, abandoned.

[30] Foreign Application Priority Data

Sep. 2, 1993 [JP] Japan ................................... 5-240275

[51] Int. Cl.⁶ ..................... H04N 5/232; H04N 5/335
[52] U.S. Cl. ................... 348/349; 348/353; 348/354; 348/277; 348/279
[58] Field of Search ................... 348/207, 222, 348/223, 224, 228, 266, 272, 273, 277, 279, 345, 349, 351, 353, 354, 355, 356; 396/79, 121, 124; H04N 5/232, 5/335

[56] References Cited

U.S. PATENT DOCUMENTS

| | | |
|---|---|---|
| 4,422,097 | 12/1983 | Inuiya ..................................... 358/227 |
| 4,706,124 | 11/1987 | Baba et al. ............................... 358/227 |
| 4,992,859 | 2/1991 | Yoshida .................................... 358/55 |
| 5,005,087 | 4/1991 | Suzuki et al. ........................... 358/227 |
| 5,055,933 | 10/1991 | Hidaka .................................... 358/227 |
| 5,192,998 | 3/1993 | Tokumitsu et al. ....................... 358/41 |
| 5,229,859 | 7/1993 | Sasaki ................................ 358/213.26 |
| 5,508,825 | 4/1996 | Kataoka .................................. 358/474 |
| 5,534,923 | 7/1996 | Suda ....................................... 348/354 |

FOREIGN PATENT DOCUMENTS 2-89997 4/1992 Japan ................................ H04N 9/00

Primary Examiner—Andrew I. Faile
Assistant Examiner—Ngoc-Yen Vu
Attorney, Agent, or Firm—Greenblum & Bernstein, P.L.C.

[57] ABSTRACT

An automatic focusing system for a still video camera has a light detector for outputting an image signal corresponding to an intensity of light which is incident on the light detector. An image signal is output for each of a plurality of colors of light that are incident on the light detector. The autofocusing system also includes a processor for determining the value of an AF signal corresponding to the focus condition of each of the image signals. A controller executes the autofocus operation. The AF signal having the highest value is used by the controller to execute the autofocus operation.

22 Claims, 9 Drawing Sheets

FIG. 2

|  | | | | | |
|---|---|---|---|---|---|
| T1 → | Mg | G | Mg | G | Mg | - - - |
| T2 → | Ye | Cy | Ye | Cy | Ye | - - - |
| T1' → | G | Mg | G | Mg | G | - - - |
| T2 → | Ye | Cy | Ye | Cy | Ye | - - - |
| T1 → | Mg | G | Mg | G | Mg | - - - |
| | ⋮ | ⋮ | ⋮ | ⋮ | ⋮ | |

29

AUTOMATIC FOCUSING SYSTEM FOR A STILL VIDEO CAMERA

This application is a continuation of application Ser. No. 08/695,547, filed Aug. 12, 1996, now abandoned, which is a continuation of application Ser. No. 08/299,425, filed Sep. 1, 1994, now abandoned.

BACKGROUND OF THE INVENTION

This invention relates to an automatic focusing device for a still video camera.

Conventionally a still video camera having a color filter provided in front of an imaging device employs an automatic focusing system which determines whether the lens is in an in-focus condition by monitoring the luminance signal corresponding to light reflected by a object to be photographed. In this autofocusing system, all colors transmitted through the filter are required in order to obtain the luminance signal. Further, the imaging device must be positioned properly in order to maximize the contrast of the light transmitted through the color filter.

However, since the light transmitted through the color filter includes colors in which there is little difference in luminance between pixels, the contrast is reduced, rendering the focusing operation difficult. Also, since luminance signals from the pixels of all colors are used, the time to process the information is increased, slowing the autofocusing operation.

SUMMARY OF THE INVENTION

This invention is intended to improve the precision in detecting the focus condition and to reduce the time required for an automatic focusing operation in a still video camera.

According to one aspect of the present invention, an automatic focusing system is provided for a still video.

The camera includes a light detector having a plurality of pixels. Each pixel outputs a signal corresponding to an intensity of light which is incident on the pixel, each of the pixels being sensitive to light having one of a plurality of wavelengths.

A plurality of memories is also included for storing the signals output by the pixels, each of the memories storing signals output by pixels sensitive to light having a similar wavelength.

A processor for processing the signals stored in the memories is also provided which, outputs an AF signal representing a predetermined number of the signals stored in each of the plurality of memories. A value of each of the AF signals corresponding to a focus condition of each of the stored signals is determined and the processor selects the AF signal which has the highest value.

A driver is also provided for driving a lens towards an infocus condition, in accordance with the selected AF signal.

According to another aspect of the present invention, a method of automatically focusing a lens of a still video camera onto an object to be photographed, is provided.

The method includes detecting light incident on the camera; outputting a signal corresponding to each pixel of the detected light; and storing the output signal corresponding to each pixel in accordance with one of a plurality of wavelengths of light incident on each pixel.

This method further includes determining an AF signal based upon a predetermined number of the pixels stored for each of the wavelengths of light; selecting one of the AF signals which has a highest value; and driving a lens towards an infocus condition, in accordance with the selected AF signal.

According to a further aspect of the present invention, an automatic focusing system for a still video camera is provided.

The camera includes a light detector for outputting an image signal corresponding to an intensity of light which is incident on the light detector. The light detector outputs an image signal for each of a plurality of colors of light.

A processor for determining an AF signal for each of the image signals is also included. The AF signal has a value which corresponds to a focusing condition of the image signals.

A controller for executing an autofocus operation, is also included which uses the AF signal which has the highest value to execute the autofocus operation.

According to another aspect of the present invention, an automatic focusing system for a still video camera is provided which includes a light detector for receiving an object image. The light detector outputs a signal corresponding to an intensity of light which is incident on the light detector and outputs image signals for each of a plurality of colors.

Also included are a plurality of memories for storing the image signals and a processor for determining AF signals having values which correspond to a focus condition of the plurality of image signals in accordance with the image signals stored in the plurality of memories.

A selector is included for selecting the AF signal which has the highest value and a controller is included for executing an autofocus operation with respect to a color corresponding to the AF signal selected by the selector.

BRIEF DESCRIPTION OF DRAWINGS

FIG. 2 is a diagram showing the arrangement of filter elements of complementary color filter;

DESCRIPTION OF THE EMBODIMENTS

The present invention will be described with reference to the accompanying drawings.

Figure 1:
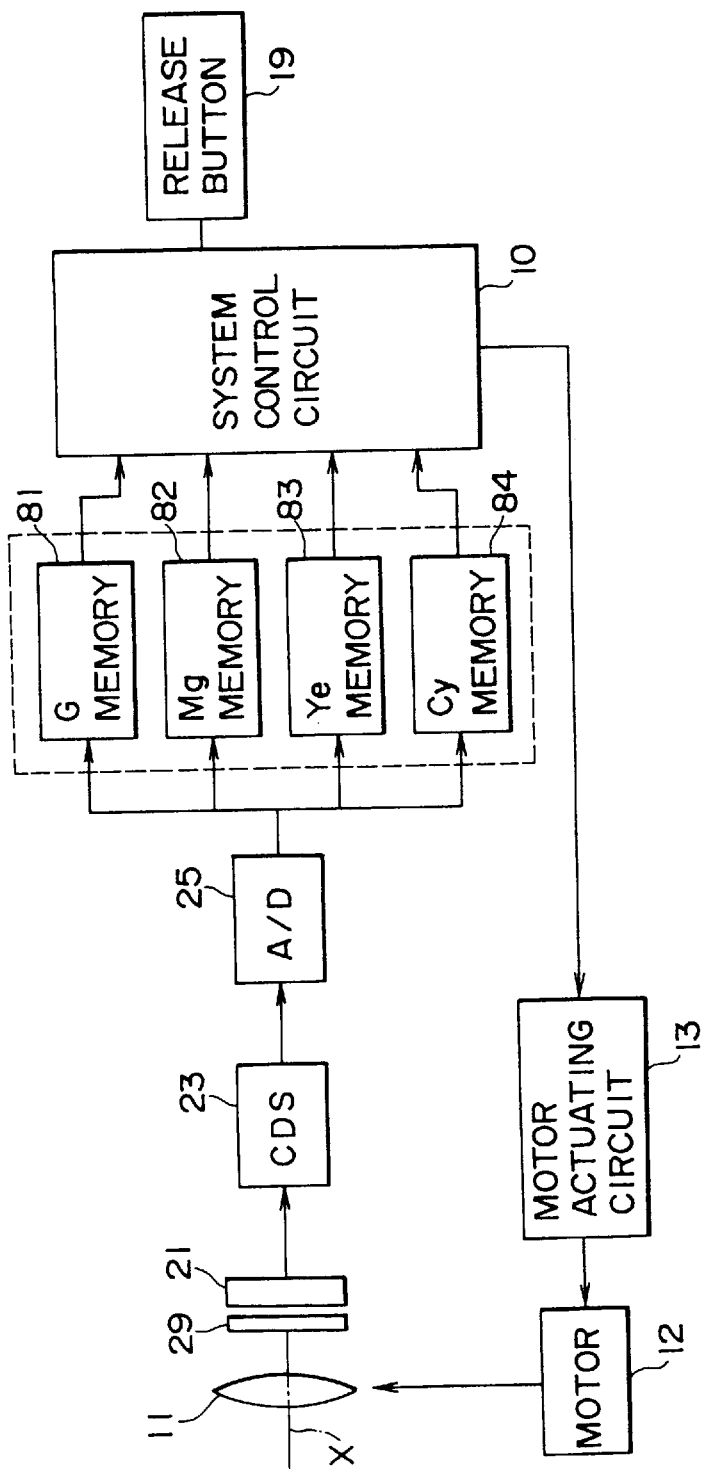
FIG. 1 is a block diagram showing a still video camera according to the present invention.

FIG. 1 is a block diagram showing a still video camera to which an embodiment of the present invention in applied.

A system control circuit 10 has a microcomputer which controls the operation of the still video camera.

The system control circuit 10 controls a motor actuating circuit 13, thereby driving a motor 12 to move a photographing lens 11 along a photographing axis X. By changing the position of the lens 11, an in-focus picture of an object to be photographed can be taken. The system control circuit 10 is also connected to a release button 19 which actuates an automatic focusing (AF) operation and releases a shutter.

An image of the object is formed on the CCD 21 after filtering is accomplished by filter 29. The filter 29 is a complementary color filter which consists of green(G), magenta(Mg), yellow(Ye), and Cyan(Cy) pixels (described later). Each pixel of the filter 29 corresponds to a pixel of the CCD 21. The CCD 21 outputs a signal corresponding to the image, to a correlation double sampling (CDS) circuit 23, where processing, such as the removal of reset noise, is accomplished. The signal is then converted by A/D converter 25. Therefore, the output of the A/D converter represents digital signals corresponding to each of the four colors of the filter 29.

Each digital signal is stored in a separate color memory. A digital signal corresponding to the output of the green pixels is stored in G memory 81. Similarly, a digital signal corresponding to the output of the magenta pixels is stored in Mg memory 82, a digital signal corresponding to the output of the yellow pixels is stored in the Ye memory 83, and a digital signal corresponding to the output of the cyan pixels is stored in the Cy memory 84.

These color signals are then processed by the system controller 10 to provide an AF signal. According to this AF signal, the motor actuating circuit 13 is controlled and the lens 11 is moved such that an in-focus image is obtained.

FIG. 2 shows the arrange of the color filter element of the filter 29. The filter 29 consists of lateral arrays T1 and T1' having alternating Mg and G pixels, and arrays T2 having alternating Ye and Cy pixels. As shown in FIG. 2, T1' has a similar pattern as T1, except that the pixels of the T1' pattern are offset by one pixel. Thus, the leftmost pixel of T1 is Mg, while the leftmost pixel of T1' is G. Further, the arrays are arranged with T1 at the top followed by T2, T1', and T2. This arrangement is then repeated over subsequent rows of pixels for the entire filter, as shown in FIG. 2.

The autofocusing operation according to the present invention will be described with reference to FIGS. 3, 4 and 5.

Figure 3:
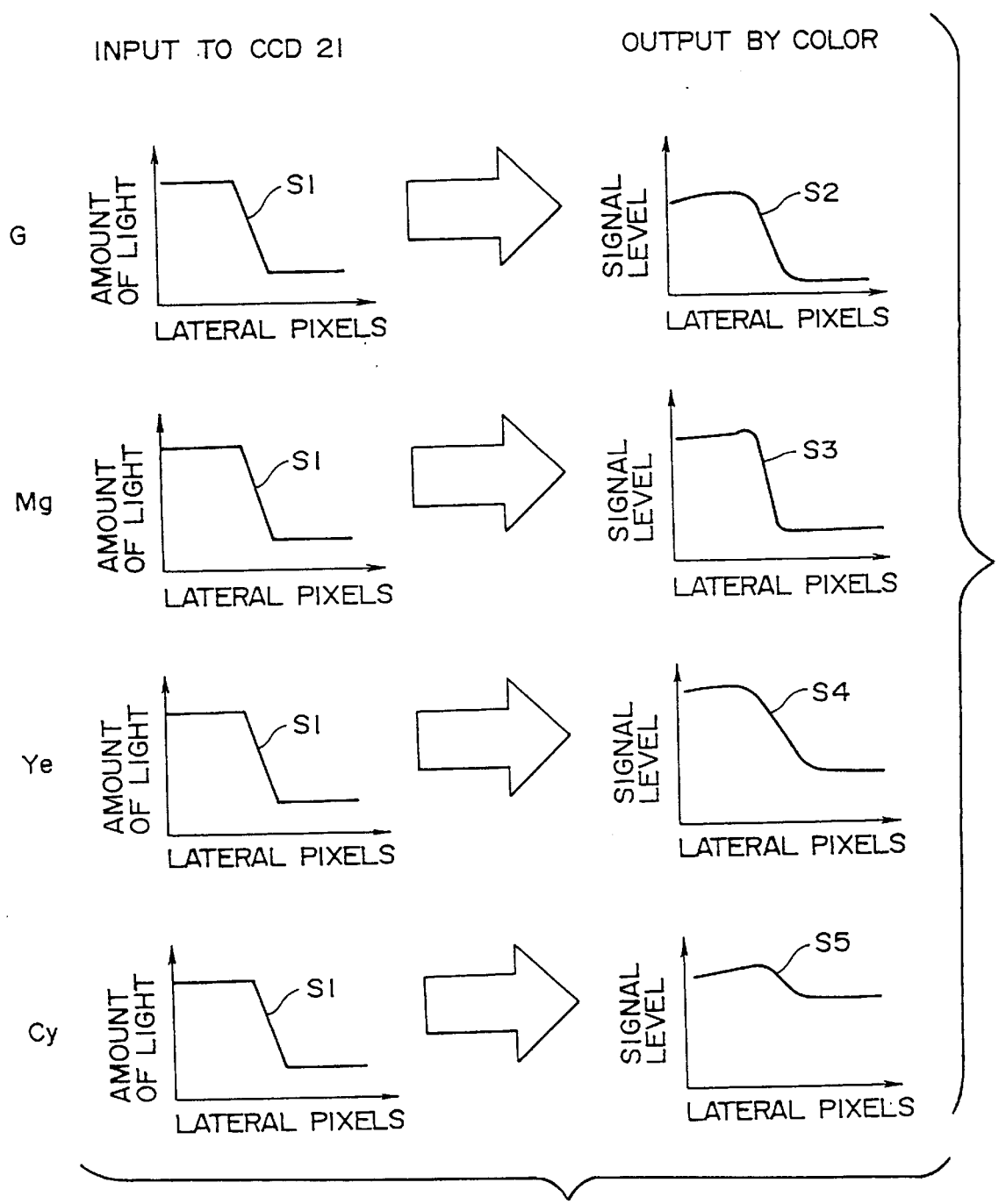
FIG. 3 is a diagram showing the input signal to a filter which is in front of a CCD, and an output signal from the CCD.

FIG. 3 illustrates the input sign to the pixels of CCD 21 (i.e., output from the filter 29) and the output signals therefrom, when light reflected from an ordinary object is incident on the CCD 21 after being transmitted through the lens 11 and the color filter 29. Line S1 denotes the input level of the light out of the color filter 29, or the distribution of the light intensity along one lateral scanning line.

Line S2 represents light that has passed through the G pixels of the color filter 29 and output by the CCD 21, and represents the green component of the light reflected by the object to be photographed. Similarly, lines S3, S4 and S5 represent light that has passed through the Mg, Ye and Cy pixels, respectively. In the example shown in FIG. 3, light that has passed through the color filter element, particularly Ye and Cy, provides a smoother curve than the input signal.

Each output signal, designated by lines S2, to S5 is processed by CDS 23, converted into a digital signal by A/D converter 25, and stored in G memory 81, Mg memory 82, Ye memory 83 and Cy memory 84, respectively. Following differential and integral processes in the system controller 10, these signals are converted into AF signals. FIG. 4 shows a change in luminance for each color across one scanning line. The AF signal is determined by integrating the change in luminance for each of the colors. Therefore, by integrating the area under the curves S6, S7, S8 and S9, the AF signals for Green, Magenta, Yellow and Cyan can be determined, respectively.

Figure 4:
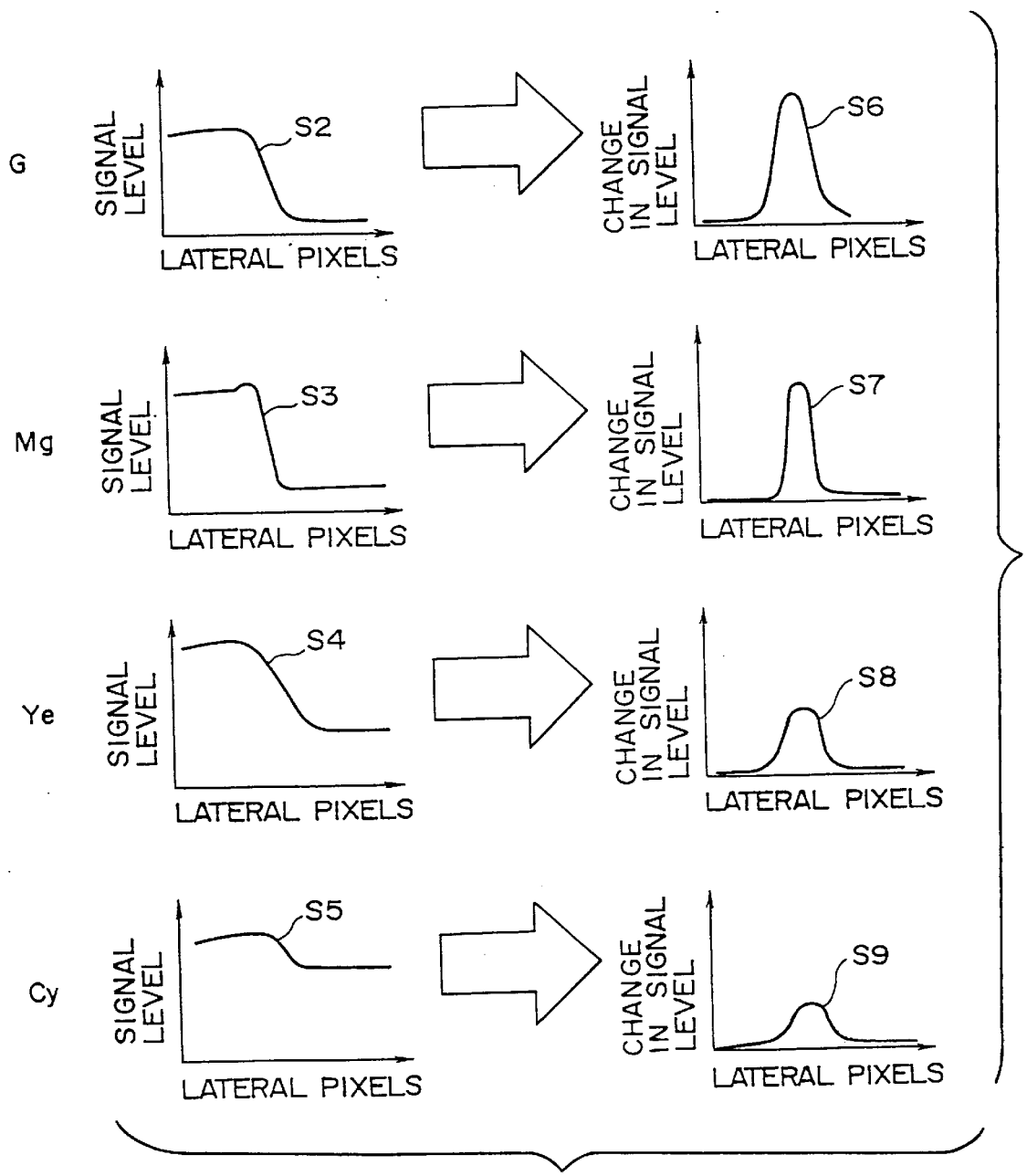
FIG. 4 is a diagram showing the output signal from the CCD and an AF signal obtained from the output signal.

In FIG. 4, the AF signal corresponding to the green component has the largest value, followed by the AF signals corresponding to the magenta component, yellow component and cyan component, respectively. Therefore, in this example, the AF signal corresponding to the green component best indicates the contrast in luminance in each part of the subject since it has the highest contrast. In this embodiment, the autofocus operation utilizes the color signal that provides the highest AF signal.

Figure 5A:
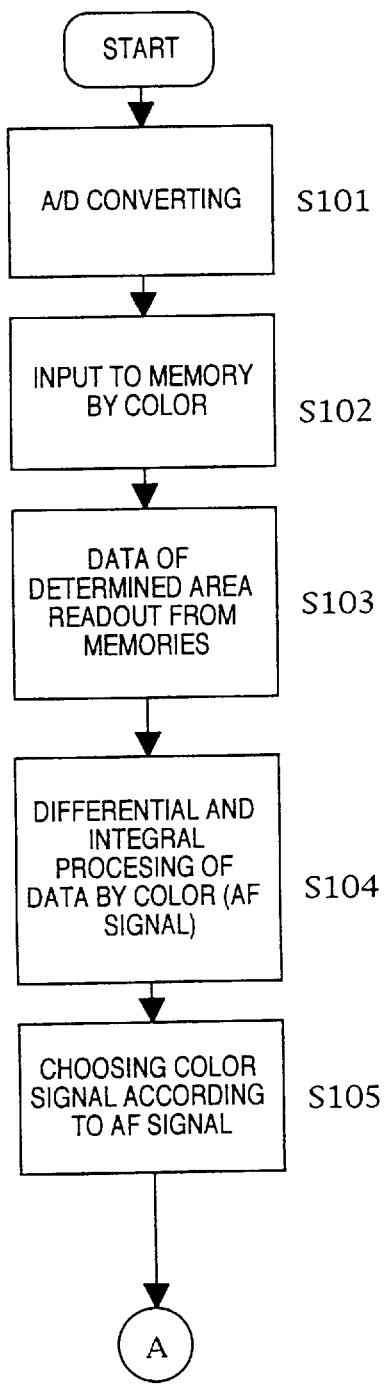
FIGS. 5A, 5B, and 5C show a flowchart of an autofocus operation according to the present invention.
Figure 5B:
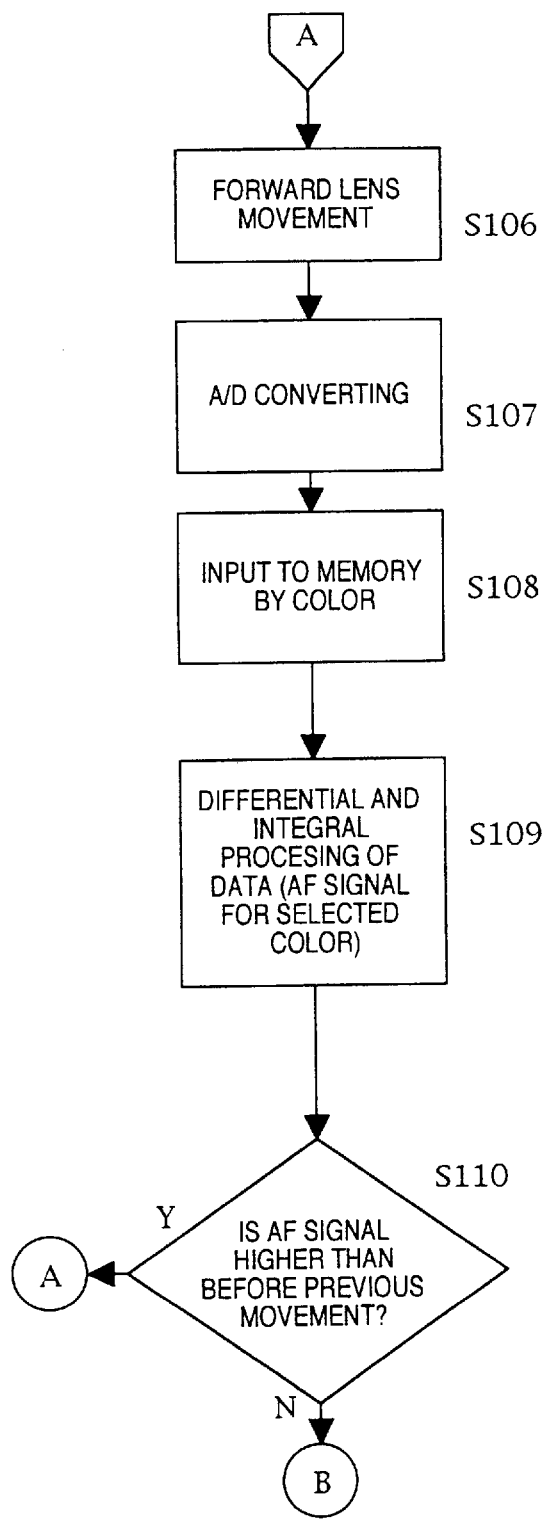
Figure 5C:
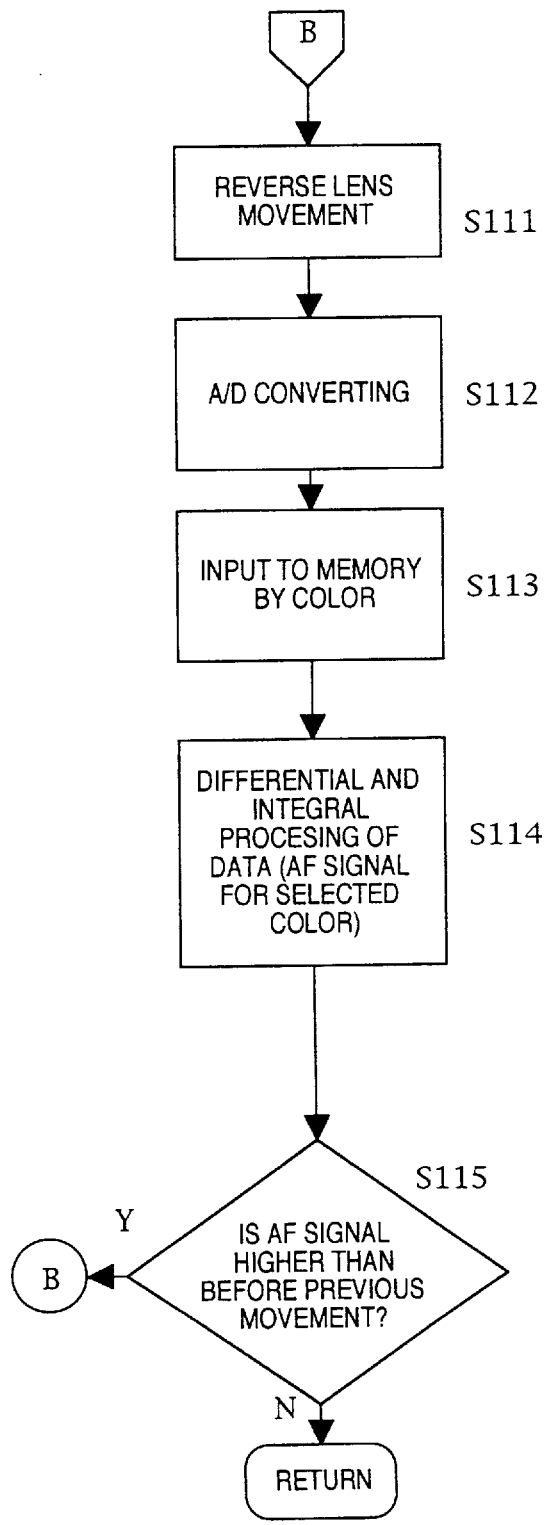

FIGS. 5A, 5B and 5C show a flowchart of the autofocus operation, according to the present invention. The autofocus operation is initiated by partially depressing a shutter button.

In step S101, the output of the CCD 21 is converted by A/D converter 25. Then, in step S102, the signals corresponding to green, magenta, yellow and cyan color signals are stored in the G memory S1, Mg memory 82, Ye memory 83, and Cy memory 84, respectively. In step S103, pixel data of an area that corresponds to a lateral scanning line positioned in the center the CCD 21, is read from the memories 81 through 84.

In step 104, differential and integral processing on the pixel data of each color readout in step S103 is performed in order to obtain the AF signal. Thus, the AF signals are obtained by integration of the absolute value of the differentiation of the digital signals corresponding to each of the color signals, designated by lines S2 to S5. Therefore, the change in signal level for each color, shown as S6, S7, S8 and S9, represents the absolute value of the differentiation of the digital signals.

Figure 6:
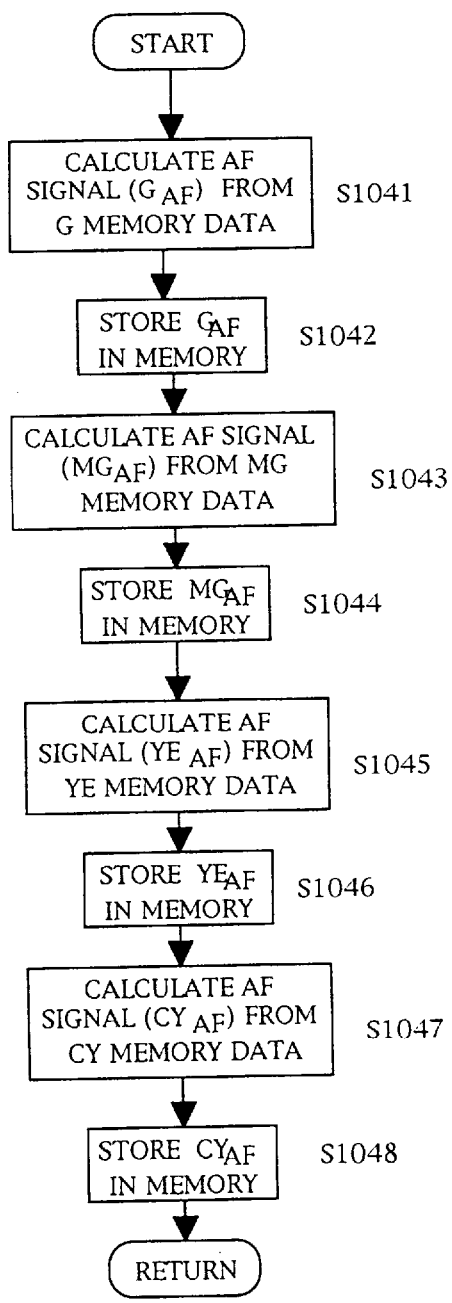
FIG. 6 is a flowchart of a subroutine of the flowchart shown in FIGS. 5A, 5B and 5C.

The subroutine of step S104 is shown in FIG. 6, and described below.

At step S1041, the AF signal $G_{AF}$ is calculated from the data stored in the G memory, and then, this value is stored in memory in step S1042.

The AF signal, $G_{AF}$, is calculated as follows:

For each pixel n having a signal level f(n), a differentiation value D(f(n)) is determined according to an equation:

$$D(f(n))=f(n)-\tfrac{1}{2}\{f(n-1)+f(n+1)\}.$$

Then, an integration I(f(n)) of the differentiated signal D(f(n) is performed according to an equation:

$$I(f(n)) = \frac{1}{7} \left\{ \sum_{n-3}^{n+3} |D(f(k))| \right\}.$$

Therefore, the AF signal is obtained according to an equation:

$$AF = \frac{1}{7} \left\{ \sum_{n-3}^{n+3} |f(k) - \frac{1}{2} [f(k-1) + f(k+1)]| \right\}.$$

Thus, the integration is performed using differentiation values for nine pixels along the scanning line. In the above description, the range n−3 to n+3 is used to illustrate the processes that are preformed if nine pixels are used. These pixels are predetermined pixels of the CCD and are located in the central portion of the CCD imaging area. In the actual embodiment, more than nine pixels are used in the integration calculation.

Similarly, the AF signals $MG_{AF}$, $Ye_{AF}$, and $Cy_{AF}$ are calculated in steps S1043, S1045, and S1047, and stored in steps S1044, S1046 and S1048, respectively.

The AF signal is maximum when an image of object is focused on the light receiving portion of the CCD 21. However, the AF signals corresponding to light having different wavelengths may be different even though the object image is focused on the CCD 21. Therefore, in this embodiment, in order to improve the accuracy of the autofocus operation, the AF signal having the highest level (and therefore, the AF signal of the color having the highest contrast), is selected, so that the autofocus operation is performed using this selected AF signal.

Figure 7:
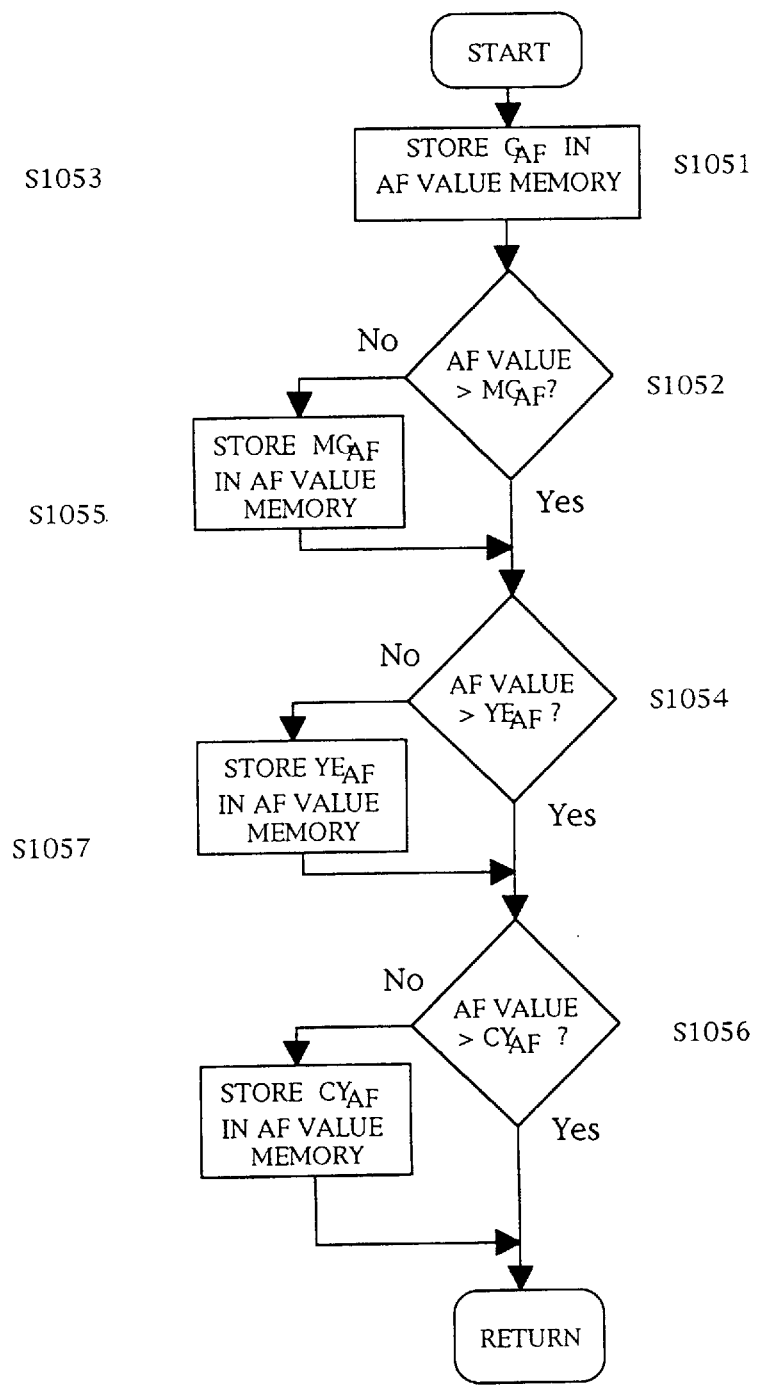
FIG. 7 is a flowchart of another subroutine of the flowchart shown in FIGS. 5A, 5B and 5C.

In step S105, the color signal having the highest AF signal is selected. This subroutine is shown in FIG. 7.

Initially, in step S1051, $G_{AF}$ is stored in the AF value memory. Then, as shown in steps S1052 through S1057, the AF value is compared with $Mg_{AF}$, $Ye_{AF}$ and $Cy_{AF}$, resulting in the maximum of the four AF values being stored in the AF value at the end of the subroutine.

The processing carried out in steps S106 through S115 uses the AF signal selected in step S105. The one AF signal selected in step S105 thereafter may be considered a "driving" AF signal.

When S106 is first executed, since the direction in which to move the lens 11 to the focal point is unknown, the lens 11 is first moved from its initial position (e.g., focused at infinity) in a predetermined direction (e.g., forward) by a predetermined amount.

Step S107 is similar to step S101, and converts the output signals from CCD 21 into digital signals. Step S108, is similar to S102, and inputs the color signals G, Ng, Ye and Cy to memories 81 to 84. However, since only the color selected in step S105 is used, step S108 can be arranged to input only the selected color signal to its memory, thereby increasing the speed of the AF operation.

Step S109 is similar to the subroutine of step S104, but performs a differential and integral processing on the color signal selected in step S105, in order to obtain the AF signal. Step 110 decides whether the AF signal has increased or decreased as a result of the movement of the lens 11 in step S106, by comparing the AF signals of step S109 with the previously determined AF signal (at step S109, or at step S104, if it is the first time through the loop). If the AF signal has increased (step S110:Y), control goes to step S106, where the lens 11 is again moved in the same direction by the calculated amount.

If the AF signal has decreased (step S110:N), control goes to step S111, where the lens 11 is moved in the reverse direction by half of the predetermined amount that was initially moved in step S106. Steps S112 through S115 are similar to steps S107 through step S110 described above. Thus at step S112, the output of the CCD 21 is converted into digital signals. At step S113 the color signals G, Mg, Ye and Cy are input to memories 81 to 84. Further, for increased AF processing speed, only the AF signal for the color selected in step S105, needs to be used.

At step S114, differential and integral processing on the selected color signal is performed, in order to determine the AF signal. This is similar to step S109 described above. At step S115, it is determined whether the AF signal has increased or decreased as a result of the movement of the lens 11 in step S106, by comparing the AF signals of step S114 with the previously determined AF signal (at step S114, or at step S109, if it is the first time through this loop). if the AF signal has increased (S115:Y), control goes to step S111 where the lens 11 is again moved in the same direction by the same predetermined amount, as was initially moved in step S106.

If the AF signal has decreased (step S115:N), control returns to a main process (not shown). At this point, it is determined that the lens 11 is within a focus allowance range and the movement of the lens 11 is stopped.

As described above, this embodiment of the present invention selects the color signal that has the largest difference in pixel luminance in order to determine the focus condition. Therefore, it can precisely detect the amount of contrast included in the reflected signal from the subject, thereby improving the precision in detecting the focus condition. Also, since this embodiment obtains the luminance signal of one color, the processing time can be reduced and the speed of the AF operation can be increased.

While the embodiment described uses the signal from only one color to detect the focus condition, it may use two or more colors. Further, although only one CCD21 is shown in the above-mentioned embodiment, a plurality of CCDs, each having similar length light paths from the lens 11, and color filters with the same construction in front of each CCD, may be used.

Further, the color filter 29 is not limited to the complementary color filter described above but may have other configurations. For instance, two CCDs may be used, one having a green filter and the other having a filter composed of red and blue pixel columns, or three CCDs may be used, one having a red filter, the second, a blue filter and the third, a green filter.

Furthermore, in step S103 of FIG. 5A, the area for reading pixel data does not need to be limited to a lateral scanning line but can be, for example, a rectangular area positioned in the center of one display.

According to this invention, it is possible to improve the precision in detecting the focus condition of an object, and in reducing the time required for automatic focusing processing.

The present disclosure relates to subject matter contained in Japanese Patent Application No. HEI 5-240275 filed on Sep. 2, 1993, which is expressly incorporated herein by reference in its entirety.

What is claimed is:

1. An automatic focusing system for a still video camera, comprising:

a lens;

a driver that drives said lens along an optical axis of said lens;

a light detector that receives an optical image through said lens and outputting color signals corresponding to a plurality of color components of said received optical image, each of said color signals representing intensities of light at a plurality of positions of said optical image;

a processor that processes each of said color signals to obtain AF signals representing a contrast for each of said color signals corresponding to said color components of said received optical image;

a selector that compares said AF signals for each of said color signals to one another and selects, from among said compared AF signals for said color signals, one AF signal representing the highest contrast color signal among said color signals; and a controller that controls said driver to locate said lens at a position where said one selected AF signal becomes greatest.

2. The automatic focusing system according to claim 1, said light detector comprising a charge coupled device having a plurality of light receiving pixels and color filters provided in front of said light receiving pixels, each of said color filters transmitting one of said plurality of color components.

3. The automatic focusing system according to claim 1, said controller further determining said position where said one selected AF signal becomes greatest by moving said lens along the optical axis to a plurality of lens positions and comparing between values of said one selected AF signal measured at said lens positions.

4. The automatic focusing system according to claim 3, wherein said driver initially moves said lens in a predetermined direction by a predetermined amount.

5. The automatic focusing system according to claim 4, further comprising: means for comparing a value of said one selected AF signal with a previous value of said one selected AF signal, and said driver comprising:

means for moving said lens for a distance and in a direction in accordance with an increase or a decrease in said value of said one selected AF signal.

6. The automatic focusing system according to claim 5, wherein when said value of said one selected AF signal increases with respect to said previous value of said one selected AF signal, said moving means moves said lens in a same direction by a calculated amount.

7. The automatic focusing system according to claim 5, wherein when said value of said one selected AF signal decreases with respect to said previous value of said one selected AF signal, said moving means moves said lens in a reverse direction by one-half of said predetermined amount.

8. The automatic focusing system according to claim 1, further comprising a plurality of memories, each of said plurality of memories corresponding to a respective color component of said received optical image and coupled to said light detector.

9. The automatic focusing system according to claim 1, wherein said processor differentiates each of said color signals, obtains absolute values of each of said differentiated color signals, and integrates each of said absolute values to obtain said AF signals.

10. The automatic focusing system according to claim 1, wherein said selector checks each of said AF signals and stores information corresponding to said one AF signal representing said highest contrast color signal among said AF signals.

11. The automatic focusing system according to claim 1, wherein once said one AF signal is selected, said controller controls said processor to process only said color signal corresponding to said highest contrast color signal to obtain a driving AF signal for controlling said driver to locate said lens at a position where said driving AF signal becomes greatest.

12. A method of automatically locating a lens of a still video camera at an in-focus position, comprising the steps of:

receiving an optical image incident on the camera through the lens and outputting color signals corresponding to a plurality of color components of the received optical image, each of the color signals representing intensities of light at a plurality of positions of the optical image;

processing each of the color signals to obtain AF signals representing a contrast for each of said color signals corresponding to said color components of the received optical image;

comparing said AF signals for each of said color signals to one another;

selecting, from among said compared AF signals for said color signals, one AF signal representing the highest contrast color signal among said color signals; and determining a position of the lens at which the one selected AF signal has a greatest value.

13. The method according to claim 12, wherein the determining step comprises moving the lens to a plurality of lens positions and comparing between values of the one selected AF signal measured at the lens positions.

14. The method according to claim 12, further comprising initially moving the lens in a predetermined direction by a predetermined amount.

15. The method according to claim 14, further comprising comparing a value of the one selected AF signal with a previous value of said one selected AF signal; and moving the lens for a distance and in a direction in accordance with an increase or a decrease in the value of the one selected AF signal.

16. The method according to claim 15, wherein when the value of the one selected AF signal increases, moving the lens in a same direction by a calculated amount.

17. The method according to claim 15, wherein when the value of the one selected AF signal decreases, moving the lens in a reverse direction by one-half of the predetermined amount.

18. The method according to claim 12, further comprising storing each color component of the received optical image in a respective memory.

19. The method according to claim 12, wherein said processing comprises:

differentiating each of the color signals;

obtaining absolute values of each of the differentiated color signals; and integrating each of said absolute values of the differentiated color signals to obtain said AF signals.

20. The method according to claim 12, said selecting including:

checking each of said AF signals; and storing information corresponding to said one AF signal representing said highest contrast color signal among said AF signals.

21. The method according to claim 12, wherein said controlling includes:

processing only said color signal corresponding to said highest contrast color signal to obtain a driving AF signal corresponding to said one selected AF signal.

22. An automatic focusing system for a still video camera, comprising:

a lens;

a driver that drives said lens along an optical axis of said lens;

a light detector that receives an optical image through said lens and outputting color signals corresponding to a plurality of color components of said received optical image, each of said color signals representing intensities of light at a plurality of positions of said optical image;

a processor that processes each of said color signals to obtain AF signals representing a contrast for each of said color signals corresponding to said color components of said received optical image;

a selector that selects, from among said AF signals for said color signals, one AF signal representing the highest contrast color signal among said color signals; and a controller that controls said processor to process only said color signal corresponding to said one AF signal, representing the highest contrast color signal among said color signals, to obtain a driving AF signal for controlling said driver to locate said lens at a position where said driving AF signal becomes greatest.

* * * * *